US008313278B2

(12) United States Patent
Simmons et al.

(10) Patent No.: US 8,313,278 B2
(45) Date of Patent: Nov. 20, 2012

(54) MODULAR INTERCHANGEABLE CARGO DECK

(75) Inventors: John B. Simmons, Corona, CA (US); Anibal J. Garcia, Chino, CA (US); Michael Patterson Johnson, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 627 days.

(21) Appl. No.: 12/101,422

(22) Filed: Apr. 11, 2008

(65) Prior Publication Data
US 2008/0213058 A1    Sep. 4, 2008

Related U.S. Application Data

(63) Continuation-in-part of application No. 11/681,053, filed on Mar. 1, 2007, now Pat. No. 7,802,958.

(51) Int. Cl.
*B60P 1/52* (2006.01)
*B60P 1/64* (2006.01)

(52) U.S. Cl. ........ 414/532; 414/531; 414/535; 414/536; 414/679

(58) Field of Classification Search .................. 414/531, 414/532, 535, 536, 679
See application file for complete search history.

(56) References Cited

U.S. PATENT DOCUMENTS

| 3,011,665 | A | * | 12/1961 | Wise | 414/535 |
| 3,220,585 | A | | 11/1965 | McCartney et al. | |
| 3,262,588 | A | * | 7/1966 | Davidson | 414/536 |
| 3,279,631 | A | | 10/1966 | McCartney | |
| 3,588,166 | A | * | 6/1971 | Day | 296/24.4 |
| 3,684,108 | A | | 8/1972 | Olson | |
| 3,697,045 | A | | 10/1972 | Farley | |
| 3,743,044 | A | | 7/1973 | Scheele | |
| 3,854,610 | A | | 12/1974 | Cardner | |
| 3,899,092 | A | | 8/1975 | Nordstrom | |
| 3,944,096 | A | | 3/1976 | Carder | |
| 4,000,870 | A | * | 1/1977 | Davies | 410/92 |
| 4,049,135 | A | * | 9/1977 | Glassmeyer | 414/351 |
| 4,077,532 | A | | 3/1978 | Bryan | |
| 4,077,590 | A | * | 3/1978 | Shorey | 410/77 |
| 4,078,818 | A | * | 3/1978 | Donnelly | 280/418.1 |
| 4,312,619 | A | | 1/1982 | Anderson et al. | |
| 4,348,150 | A | | 9/1982 | Inghram et al. | |

(Continued)

FOREIGN PATENT DOCUMENTS
DE    200 16 115 U1    2/2001
(Continued)

OTHER PUBLICATIONS

English translation of DE 10014990 A1, previously of record.*

(Continued)

*Primary Examiner* — James Keenan
(74) *Attorney, Agent, or Firm* — Klintworth & Rozenblat IP LLC

(57) ABSTRACT

A removable, modular, cargo deck trailer system may include different types of modular, interchangeable, removable deck units which are configured to be removably and interchangeably attached to a trailer. The different types of modular, interchangeable, removable deck units may collectively include a plurality of moving apparatus for moving cargo in a lengthwise direction relative to the deck units, for moving cargo in a vertical direction relative to the deck units, and for moving cargo in at least one of a widthwise direction relative to the deck units, and in a rotating direction relative to the deck units.

12 Claims, 7 Drawing Sheets

U.S. PATENT DOCUMENTS

| | | | |
|---|---|---|---|
| 4,455,118 | A | 6/1984 | Scharf |
| 4,541,768 | A | 9/1985 | Walker et al. |
| 4,704,062 | A | 11/1987 | Hale |
| 4,737,055 | A * | 4/1988 | Scully .......................... 296/35.3 |
| 4,750,855 | A * | 6/1988 | Anderson ..................... 414/498 |
| 4,780,043 | A * | 10/1988 | Fenner et al. ................. 414/502 |
| 4,806,061 | A | 2/1989 | Fenton |
| 4,875,645 | A * | 10/1989 | Courter ....................... 244/137.1 |
| 4,907,935 | A | 3/1990 | Mankey |
| 4,984,962 | A * | 1/1991 | Jarvinen ....................... 414/812 |
| 5,110,153 | A | 5/1992 | Kallansrude et al. |
| 5,118,241 | A | 6/1992 | Cochran et al. |
| 5,165,838 | A | 11/1992 | Kallansrude et al. |
| 5,184,366 | A | 2/1993 | Rawdon et al. |
| 5,218,794 | A | 6/1993 | Ehrlich |
| 5,219,259 | A | 6/1993 | Cochran et al. |
| 5,467,827 | A * | 11/1995 | McLoughlin ................... 169/24 |
| 5,630,694 | A | 5/1997 | Ihara |
| 5,662,453 | A | 9/1997 | Gerstner et al. |
| 6,071,063 | A | 6/2000 | McGrath et al. |
| 6,520,736 | B2 | 2/2003 | Pratt |
| 6,547,506 | B1 * | 4/2003 | Jacob ........................... 414/498 |
| 6,622,846 | B1 | 9/2003 | Dean |
| 7,134,829 | B2 | 11/2006 | Quenzi et al. |
| 2004/0080206 | A1 | 4/2004 | Parsons |
| 2004/0155230 | A1 | 8/2004 | Fortin |
| 2008/0213074 | A1 | 9/2008 | Garcia et al. |

FOREIGN PATENT DOCUMENTS

| | | |
|---|---|---|
| DE | 100 14 990 A1 | 10/2001 |
| JP | 63-173739 A | 7/1988 |
| WO | 96/03304 A | 2/1996 |
| WO | WO 96/03304 | 2/1996 |

OTHER PUBLICATIONS

English translation of DE 20016115 U1, previously of record.*

European Patent Office (International Searching Authority) International Search Report dated Jul. 10, 2009, for PCT/US09/37692 filed Mar. 19, 2009.

Related U.S. Appl. No. 11/681,053, filed Mar. 1, 2007 entitled: Versatile Military Cargo Truck & Trailer Deck Design.

Marlowe, Tom; "MRAP Recovery"; May 13, 2009; KMI Media Group; http://www.military-logistics-forum.com/mit-archives/112-mlf-2009-volume-3-issue-4/1002-mrap-recovery.pdf.

Johnson, Trinace; "Soldiers Test Vehicle Recovery Trailer"; Jun. 2010, USAASC—Army AL&T Online Monthly; http://www.usaasc.info/alt_online/printer_friendly.cfm?iid=1006&aID=13.

Defense Update; Online Defense Magazine "U.S. Army Evaluates MRAP Recovery System as part of Joint Recovery and Distribution System (JRaDS)" ; © Copyright 2009—Defense Update, Online Holdings International; http://defense-update.com/products/j/jrads_mrap_recovery_040709.html.

* cited by examiner

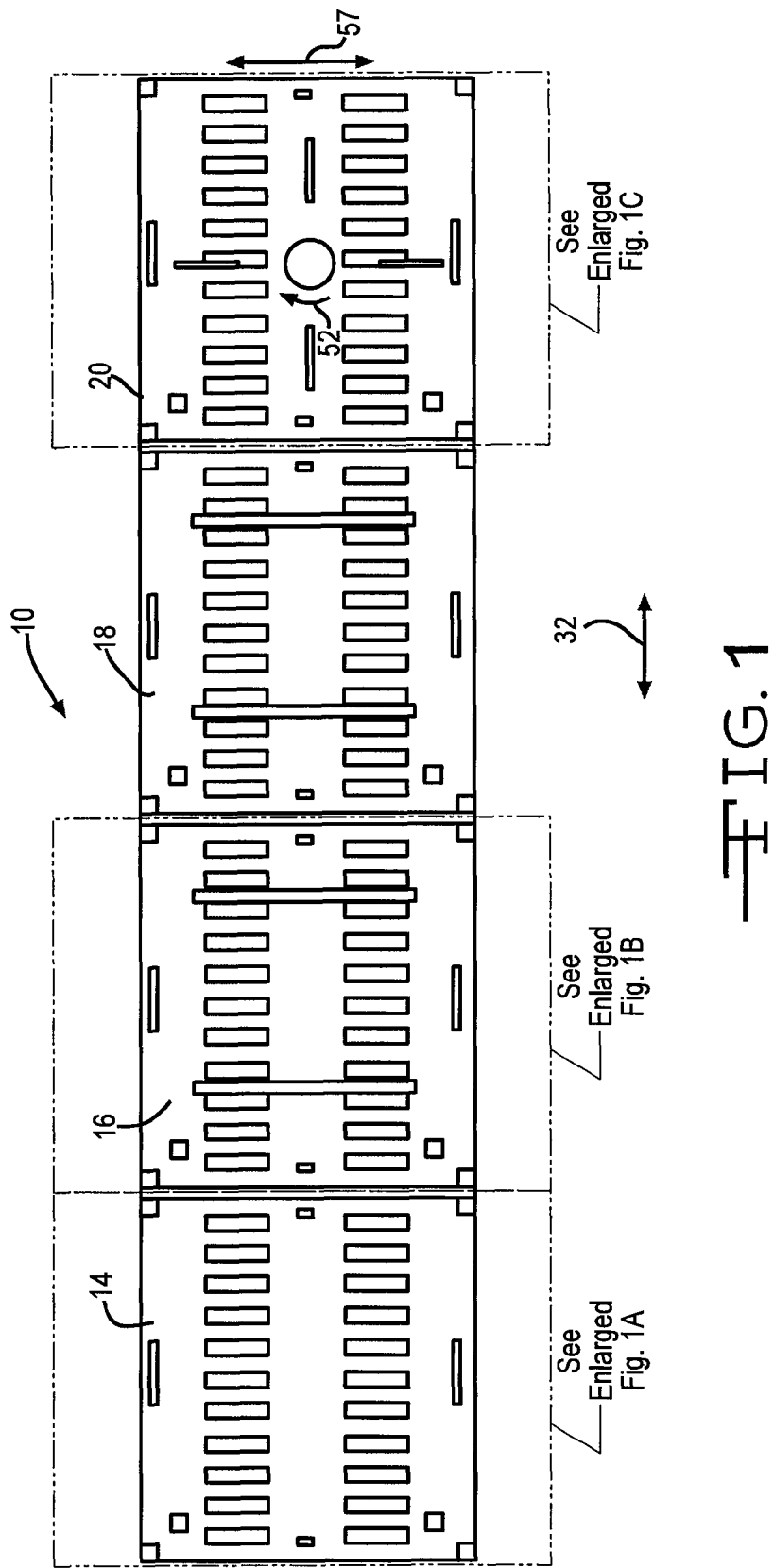

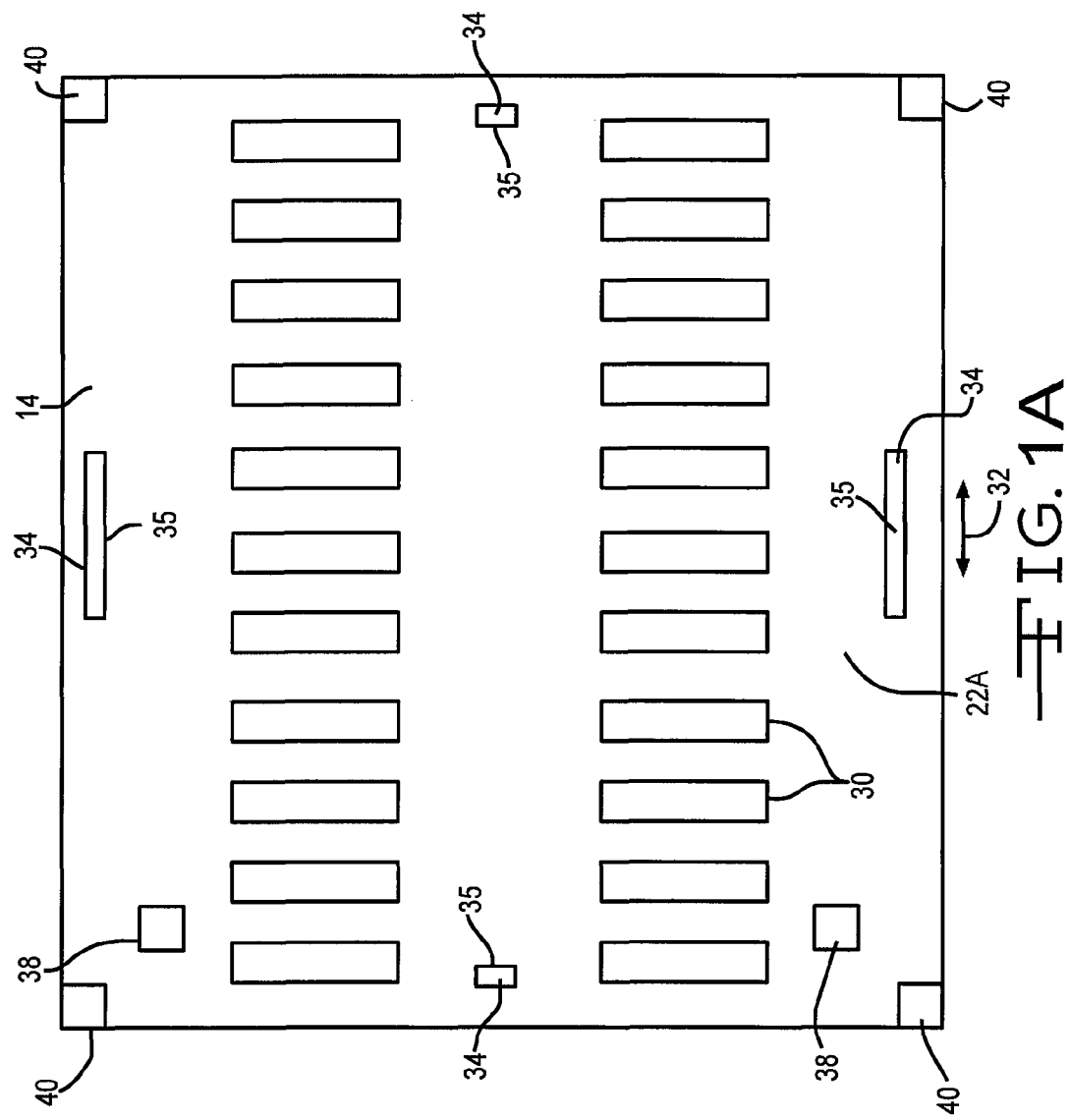

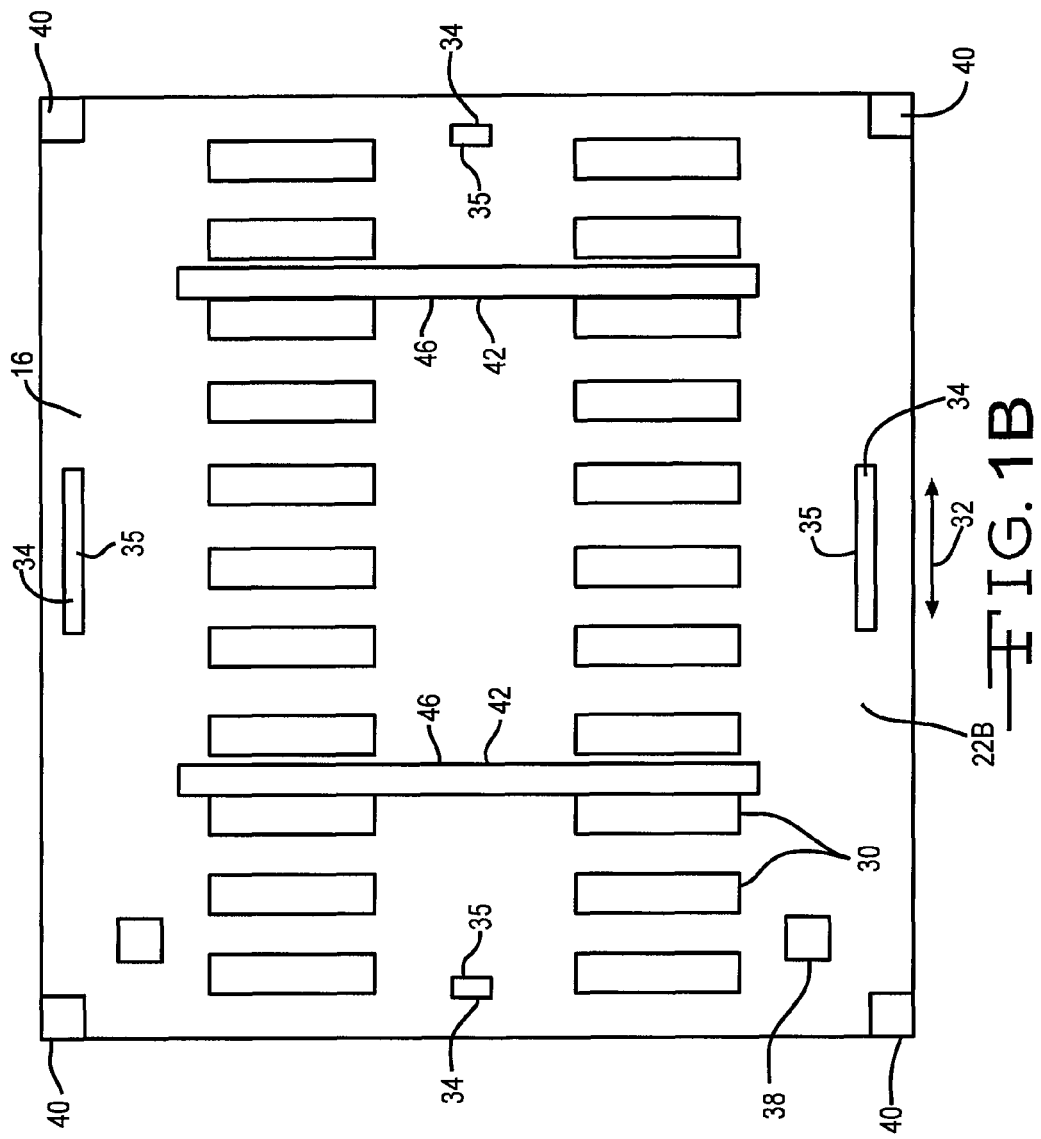

MODULAR INTERCHANGEABLE CARGO DECK

RELATED APPLICATIONS

This disclosure is a continuation-in-part of Ser. No. 11/681,053, filed Mar. 1, 2007, now U.S. Pat. No. 7,802,958.

BACKGROUND

A variety of trailers exist today for moving and/or loading cargo such as military, vehicle, aircraft, and other types of cargo. The trailer decks on these trailers often are designed to only move certain types of cargo in certain types of ways. For instance, one trailer deck system may be used to move cargo lengthwise along the deck system. Another type of trailer deck system may be used to move cargo widthwise and/or in a rotating direction relative to the deck system. Yet another type of trailer deck system may be used to move cargo such as disabled vehicles. Because of the fixed nature and functions of the trailer deck systems, many different types of trailer deck systems and/or equipment may be required to move different types of cargo. This may lead to increased costs, increased equipment needed, increased types of trailer deck systems required, and increased time to move cargo.

A removable, modular, interchangeable, cargo deck trailer system, and a method of use thereof, is needed to decrease one or more problems associated with one or more of the existing cargo deck trailer systems and/or methods of use thereof.

SUMMARY

In one aspect of the disclosure, a removable, modular, cargo deck trailer system may comprise a plurality of modular, interchangeable, removable deck units which are configured to be removably and interchangeably attached to a trailer. The deck units may collectively comprise: a plurality of moving apparatus for moving cargo in a lengthwise direction relative to the deck units; for moving cargo in a vertical direction relative to the deck units; and for moving cargo in at least one of a widthwise direction relative to the deck units, and in a rotating direction relative to the deck units.

In another aspect of the disclosure, a trailer deck system may comprise a deck unit comprising a plurality of hydraulic lift members. The plurality of hydraulic lift members may be configured to extend from positions substantially flush to or within a surface of the deck unit to positions distances away from the surface of the deck unit.

In yet another aspect of the disclosure, a method of moving cargo on a trailer deck system may be provided. In one step, three different types of modular, interchangeable, removable deck units may be provided. The first type of modular, interchangeable, removable deck unit may comprise a first moving apparatus. The second type of modular, interchangeable, removable deck unit may comprise a second moving apparatus. The third type of modular, interchangeable, removable deck unit may comprise a third moving apparatus. In another step, at least one of the three different types of modular, interchangeable, removable deck units may be removeably and interchangeably attached to a trailer. In yet another step, cargo may be moved in at least one of: a lengthwise direction relative to the first type of modular, interchangeable, removable deck unit using the first moving apparatus; a vertical direction relative to the second type of modular, interchangeable, removable deck unit using the second moving apparatus; a widthwise direction relative to the third type of modular, interchangeable, removable deck unit using the third moving apparatus; and a rotating direction relative to the third type of modular, interchangeable, removable deck unit using the third moving apparatus.

These and other features, aspects and advantages of the disclosure will become better understood with reference to the following drawings, description and claims.

BRIEF DESCRIPTION OF THE DRAWINGS

FIG. 1 shows a top view of one embodiment of a removable, modular, cargo deck trailer system attached to a trailer;

FIG. 1A shows an enlarged view within rectangle 1A of FIG. 1;

FIG. 1B shows an enlarged view within rectangle 1B of FIG. 1;

FIGS. 3-3C show top views of differing embodiments of cargo which may be moved by the modular, interchangeable, and removable deck units of the deck trailer system of FIGS. 1, 1A-1C, and 2.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1C:
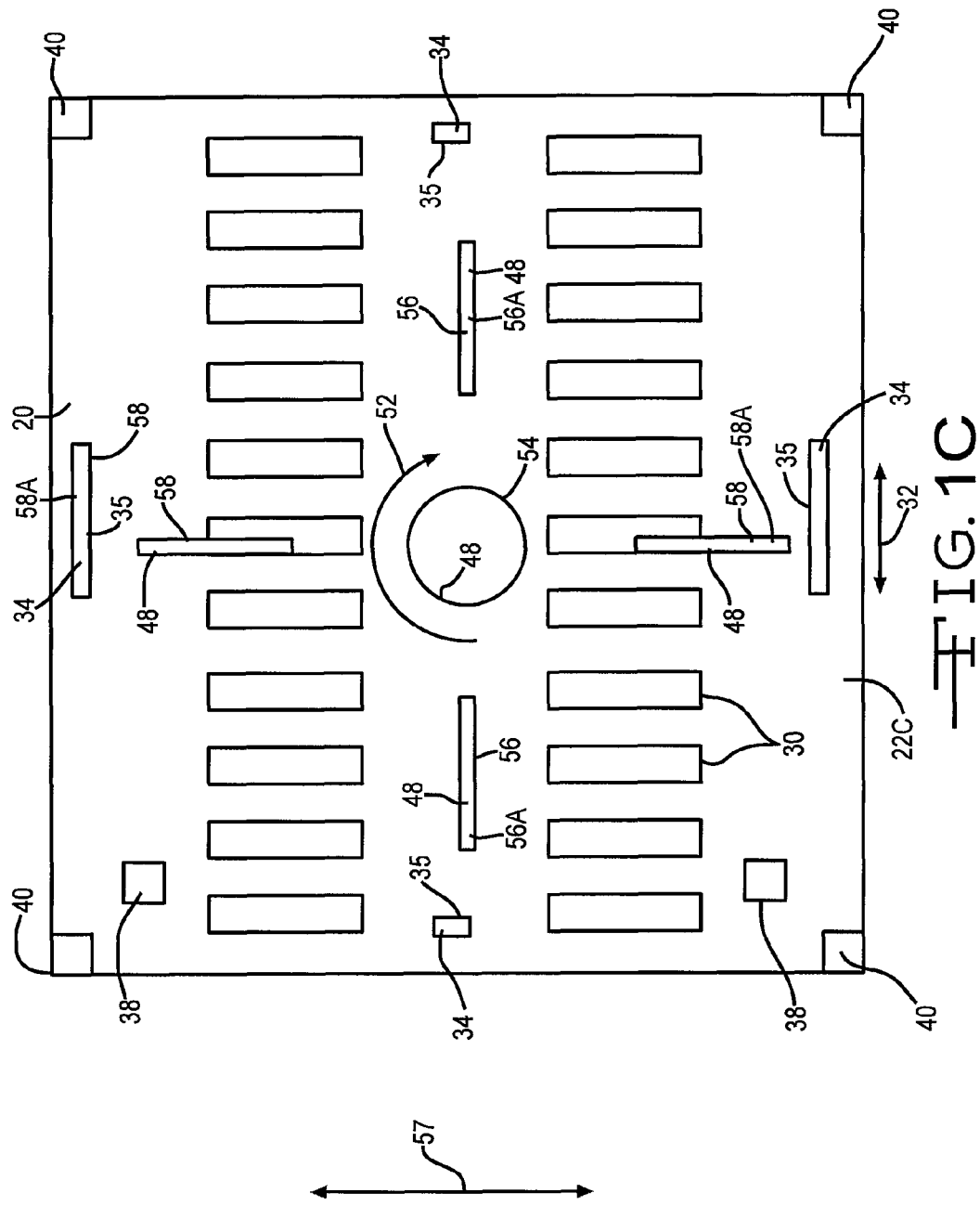
FIG. 1C shows an enlarged view within rectangle 1C of FIG. 1.
Figure 2:
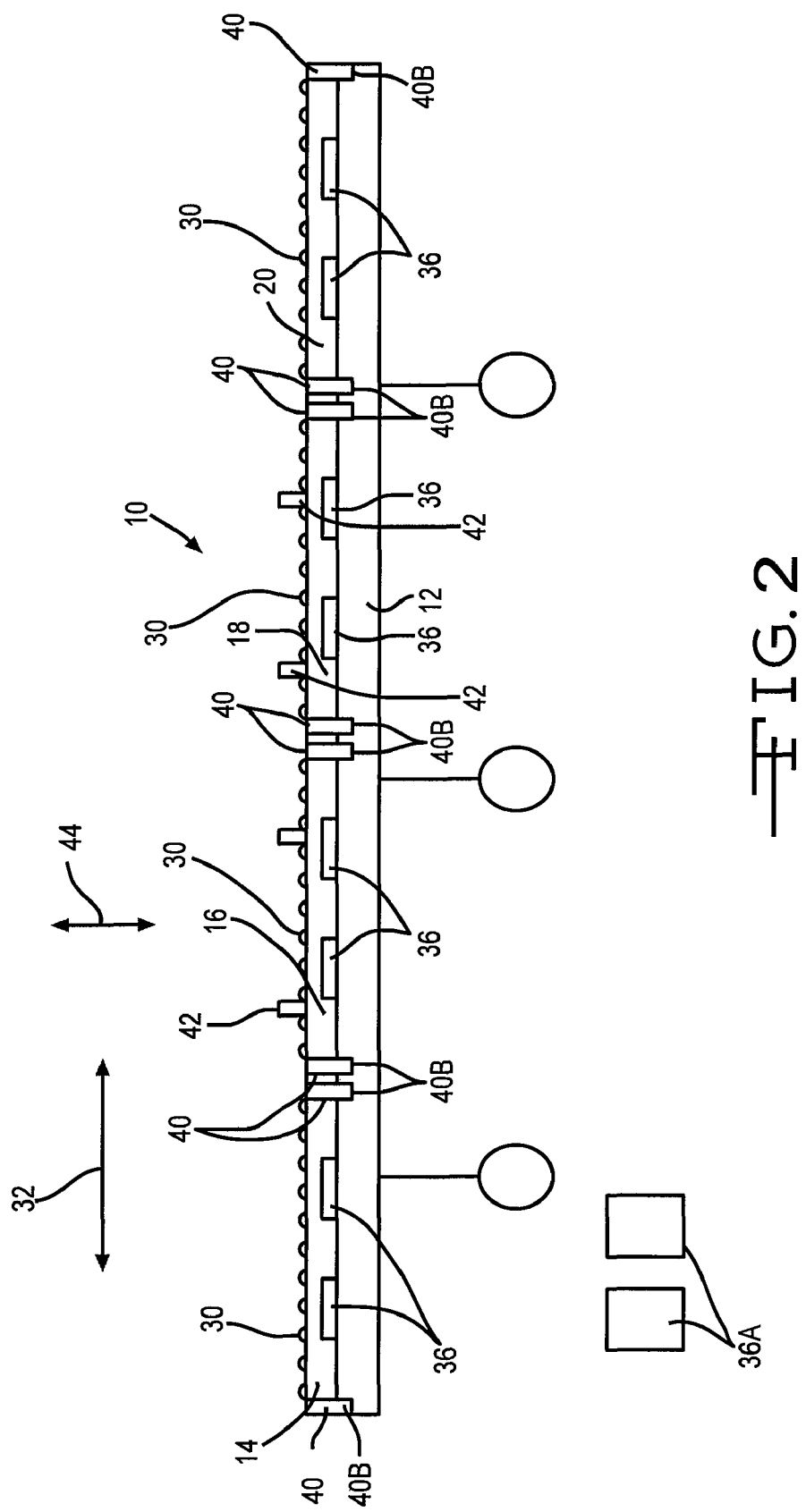
FIG. 2 shows a side view of the removable, modular, cargo deck trailer system of FIG. 1.

FIGS. 1 and 2 show top and side views of one embodiment of a removable, modular, cargo deck trailer system 10 attached to a trailer 12. FIGS. 1A shows an enlarged view within rectangle 1A of FIG. 1. FIG. 1B shows an enlarged view within rectangle 1B of FIG. 1. FIG. 1C shows an enlarged view within rectangle 1C of FIG. 1. The trailer 12, to which the cargo deck trailer system 10 may be attached, may comprise a JRaD trailer, a flatbed trailer, and/or another type of trailer. As shown in FIGS. 1 and 2, the cargo deck trailer system 10 may comprise a plurality of modular, interchangeable, removable deck units 14, 16, 18, and 20 which may be configured to be removably and interchangeably attached to the trailer 12. Deck unit 14, a close-up view which is shown in FIG. 1A, may comprise a first type of modular, interchangeable, removable deck unit which may be configured to be removably and interchangeably attached to the trailer 12 shown in FIG. 2. Deck unit 16 may comprise a second type of modular, interchangeable, removable deck unit shown in FIG. 1B which may be configured to be removably and interchangeably attached to the trailer 12 shown in FIG. 2. Deck unit 18 may be identical in every respect to the deck unit 16 and may comprise the identical second type of modular, interchangeable, removable deck unit as shown in FIG. 1B for deck unit 16. As a result, everything discussed herein with respect to the second type of deck unit 16 may apply equally to deck unit 18 which is also considered to be the second type of deck unit. Deck unit 20 may comprise a third type of modular, interchangeable, removable deck unit shown in FIG. 1C which may be configured to be removably and interchangeably attached to the trailer 12 shown in FIG. 2.

FIGS. 3, 3A, 3B, and 3C show top views of differing embodiments of cargo 28, 28A, 28B, and 28C which may be moved by the deck units 14, 16, 18, and 20 of FIGS. 1, 1A, 1B, 1C, and 2. The cargo 28-28C may comprise military cargo, aircraft cargo, and/or other types of cargo. The cargo 28 of FIG. 3 may comprise two twenty foot long loads such as ISO loads, crop loads, and flatrack loads. The cargo 28A of FIG. 3A may comprise four 463L pallets which are 88 inches wide. The cargo 28B of FIG. 3B may comprise five 463L pallets which are 108 inches wide. The cargo 28C of FIG. 3C may comprise a twenty foot long load 29 with two AIK moveable pallets 31. In still other embodiments, varying numbers, types, and sizes of deck units may be used to move varying types, sizes, and numbers of cargo.

Figure 3:
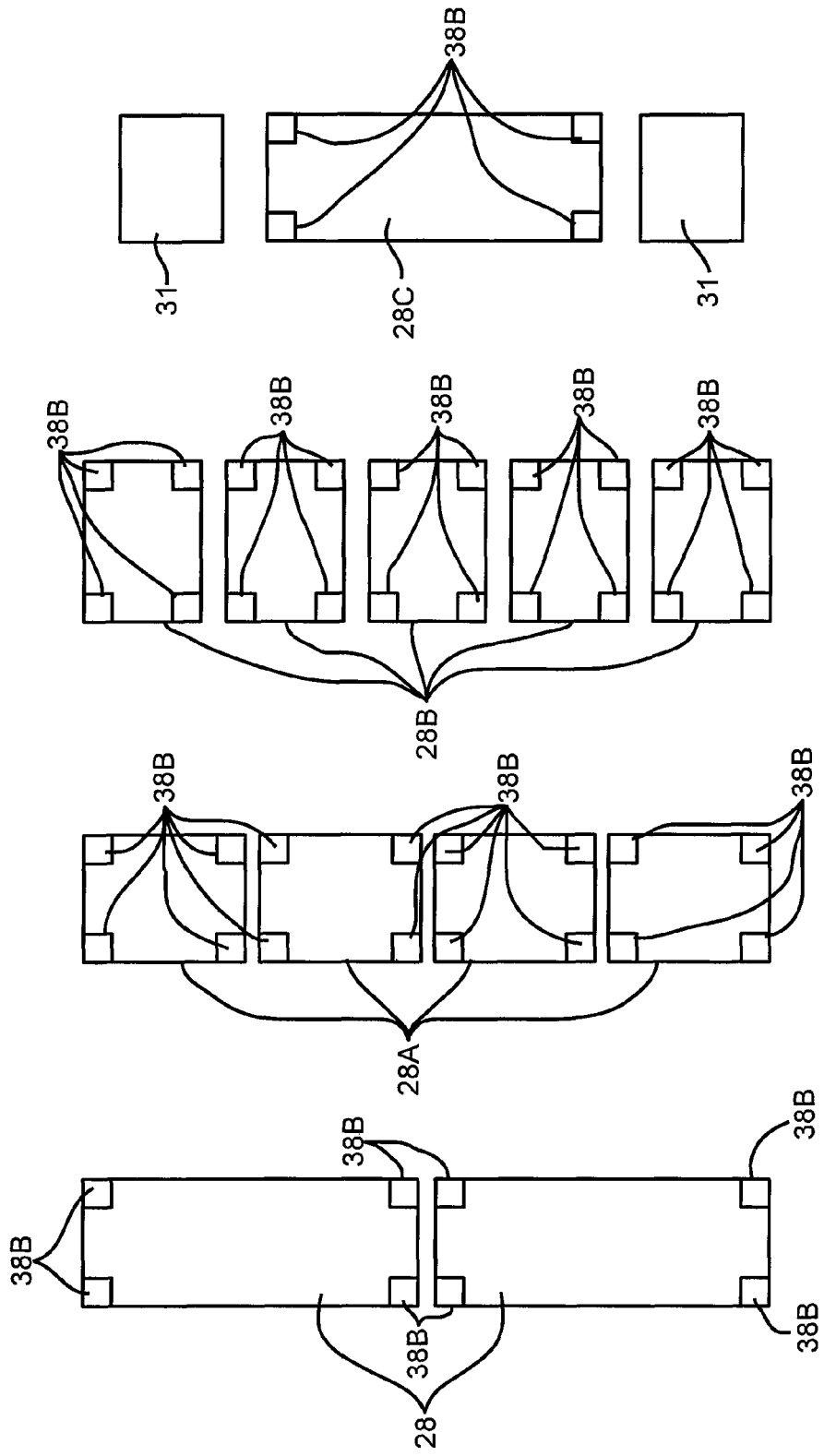

As shown in FIGS. 1A, 1B, and 1C, the different types of deck units 14, 16, and 20 may each comprise first moving apparatus 30 for moving the cargo 28-28C of FIGS. 3-3C along surfaces 22A, 22B, and 22C of the deck units 14, 16, and 20 in a lengthwise direction 32 relative to the deck units 14, 16, and 20. In other embodiments, any number of the deck units 14, 16, 18, and 20 may comprise first moving apparatus 30 for moving cargo 28-28C in the lengthwise direction 32 relative to the deck units 14, 16, 18, and 20. The first moving apparatus 30 may comprise moving rollers aligned perpendicular to the lengthwise direction 32.

The different types of deck units 14, 16, and 20 may each comprise retractable and extendable stop members 34 for retaining the cargo 28-28C of FIGS. 3-3C on deck units 14, 16, and 20. The stop members 34 may comprise rails, gates, bars, blocks, or other types of stop members for retaining the cargo 28-28C of FIGS. 3-3C on deck units 14, 16, and 20. The stop members 34 may be adapted to retract within slots 35 in the surfaces 22A, 22B, and 22C of the deck units 14, 16, and 20 to positions substantially flush to or within the surfaces 22A, 22B, and 22C in order to allow the cargo 28-28C of FIGS. 3-3C to be moved over the stop members 34. The stop members 34 may also be adapted to extend to positions distances away/above the surfaces 22A, 22B, and 22C to prevent the cargo 28-28C of FIGS. 3-3C from moving past the stop members 34. In other embodiments, any number of the deck units 14, 16, 18, and 20 may have any type and/or number of stop members 34.

As shown in FIG. 2, the different types of deck units 14, 16, 18, and 20 may each comprise forklift holes 36 for inserting forklift members 36A into the forklift holes 36 in order to lift the deck units 14, 16, 18, and 20 off and/or onto the trailer 12. In other embodiments, any number of the deck units 14, 16, 18, and 20 may comprise any number and/or type of forklift holes 36.

The deck units 14, 16, and 20 may comprise restraint members 38 for securing the cargo 28-28C of FIGS. 3-3C on the deck units 14, 16, and 20. The restraint members 38 may comprise male members for inserting into female holes 38B of cargo 28-28C as shown in FIGS. 3-3C. In other embodiments, the restraint members 38 may vary in number and/or type for each of the deck units 14, 16, and 20.

The different types of deck units 14, 16, and 20 may comprise interface members 40 for securing the deck units 14, 16, and 20 to one another and/or to the trailer 12. The interface members 40 may comprise female holes for inserting male members 40B of the trailer 12 and/or other deck units 14, 16, 18, and 20. In other embodiments, the interface members 40 may vary in number and/or type.

As shown in FIG. 1B, the second type of deck unit 16 may comprise second moving apparatus 42 for moving the cargo 28-28C of FIGS. 3-3C in a vertical direction 44 as shown in FIG. 2 relative to surface 22B of the deck unit 16. The second moving apparatus 42 may comprise a plurality of hydraulic lift members such as hydraulic lift bars for lifting the cargo 28C of FIG. 3C off the surface 22B of the deck unit 16. The second moving apparatus 42 may be configured to be retracted within slots 46 within the surface 22B to positions substantially flush to or within the surface 22B. The second moving apparatus 42 may also be configured to be extended to positions distances away/above the surface 22B. In such manner, by extending the second moving apparatus 42, the cargo 28C of FIG. 3C may be lifted off the surface 22B. Pallets 31 shown in FIG. 3C which may be disposed on the surface 22B may then be moved under the cargo 28C. The second moving apparatus 42 may then be retracted to place the cargo 28C on the pallets 31 on the surface 22B. In other embodiments, a varying number and/or type of second moving apparatus 42 may be used to move varying types of cargo in a vertical direction 44 as shown in FIG. 2.

As shown in FIG. 1C, the third type of deck unit 20 may comprise third moving apparatus 48 for moving the cargo 28-28C of FIGS. 3-3C in a widthwise direction 57 relative to the deck unit 20, and/or for moving cargo 28-28C in a rotating direction 52 relative to the deck unit 20. The third moving apparatus 48 may comprise a retractable and extendable turntable 54 which is configured to extend from a position substantially flush to or within the surface 22C of the deck unit 20 to a position a distance away/above the surface 22C of the deck unit 20 in order to rotate the cargo 28-28C in rotating direction 52. The third moving apparatus 48 may also comprise retractable and extendable side-shift rollers 56 and retractable and extendable pallet-turn rollers 58 which are each configured to extend from positions substantially flush to or within slots 56A and 58A in the surface 22C of the deck unit 20 to positions distances away from the surface 22C of the deck unit 20. If used alone, the retractable and extendable side-shift rollers 56 may move the cargo 28-28C of FIGS. 3-3C in a widthwise direction 57 relative to the deck unit 20. If used in conjunction with the pallet turn-rollers 58 and/or turntable 54, the retractable and extendable side-shift rollers 56 may rotate the cargo 28-28C of FIGS. 3-3C in rotating direction 52. If used alone, the pallet-turn rollers 58 may move the cargo 28-28C of FIGS. 3-3C in a lengthwise direction 32 relative to the deck unit 20. If used in conjunction with the retractable and extendable side-shift rollers 56 and/or turntable 54, the pallet-turn rollers 58 may rotate the cargo 28-28C of FIGS. 3-3C in rotating direction 52.

In other embodiments, the modular, interchangeable, removable deck units 14, 16, 18, and 20 may be adapted to be removably attached to the trailer 12 in different combinations in order to move different types of cargo 28-28C in different ways. For instance, the first type of deck unit 14 may be used in the combination of deck units attached to the trailer 12 if the cargo 28-28C needs to be moved in a lengthwise direction 32 along the deck units. The second type of deck unit 16 may be used in the combination of deck units attached to the trailer 12 if the cargo 28-28C needs to be lifted in a vertical direction 44 relative to the deck units. The third type of deck unit 20 may be used in the combination of deck units attached to the trailer 12 if the cargo 28-28C needs to be moved in a widthwise direction 57 and/or a rotating direction 52 relative to the deck units. As a result, the modularity and interchangeability of the deck units 14, 16, 18, and 20 may allow varied types of cargo 28-28C to be moved.

Figure 4:
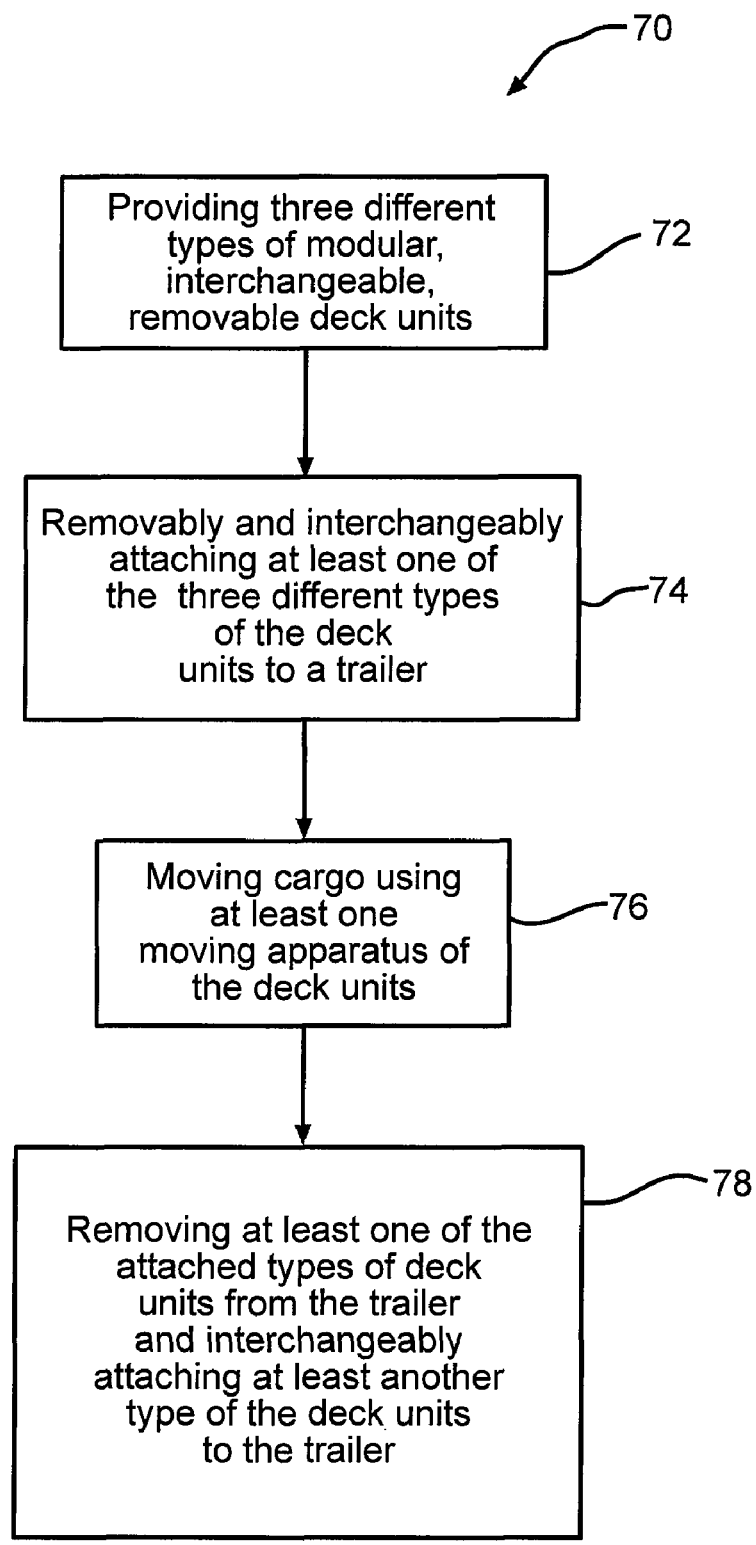
FIG. 4 shows a flowchart of one embodiment of a method of moving cargo on a trailer deck system.

FIG. 4 shows a flowchart of one embodiment of a method 70 of moving cargo 28-28C on a trailer deck system 10. In one step 72, three different types of modular, interchangeable, and removable deck units 14, 16 (and identical 18), and 20 may be provided. The first type of deck unit 14 may comprise a first moving apparatus 30 which may comprise rollers. The second type of deck unit 16 may comprise a second moving apparatus 42 which may comprise a plurality of hydraulic lift members. The third type of deck unit 20 may comprise a third moving apparatus 48 which may comprise at least one of: a retractable and extendable turntable 54; retractable and extendable side-shift rollers 56; and retractable and extendable pallet-turn rollers 58.

In another step 74, at least one of the three different types of removable deck units 14, 16 (and identical 18), and 20 may be removeably and interchangeably attached to a trailer 12. In one embodiment, step 74 may comprise removeably and interchangeably attaching two or more different types of the deck units 14, 16 (and identical 18), and 20 to the trailer 12.

In yet another step 76, cargo 28-28C may be moved in at least one of: a lengthwise direction 32 relative to the first type of deck unit 14 using the first moving apparatus 30; a vertical direction 44 relative to the second type of deck unit 16 (or identical 18) using the second moving apparatus 42; a widthwise direction 57 relative to the third type of deck unit 20 using the third moving apparatus 48; and/or a rotating direction 52 relative to the third type of deck unit 20 using the third moving apparatus 48.

In still another step 78, at least one of the three different types of deck units 14, 16 (and identical 18), and 20 may be removed from the trailer 12, and at least one different deck unit 14, 16 (and identical 18), and 20 may be interchangeably attached to the trailer 12. In such manner, varied combinations of different types of deck units 14, 16 (and identical 18), and 20 may be attached to the trailer 12 depending on what type of cargo 28-28C is to be moved. In another embodiment, all of the different types of deck units 14, 16 (and identical 18), and 20 may be removed from the trailer 12 in order to load a disabled vehicle onto the trailer 12. The deck units 14, 16 (and identical 18), and 20 may be removed by, after detaching male members 40B of the trailer 12 from the interface members 40, inserting forklift members 36A into the forklift holes 36 in order to lift the deck units 14, 16 (and identical 18), and 20 off the trailer 12. In yet another embodiment, the trailer 12 may comprise a JRaD trailer which, after detaching male members 40B of the trailer 12 from the interface members 40, may be tilted in order to remove the deck units 14, 16 (and identical 18), and 20 without the need of a forklift.

One or more embodiments of the disclosure may allow for varied types of cargo to be carried on trailers by interchanging different types of modular, removable, interchangeable deck units which may each be adapted to move the cargo in varied ways. The different types of modular, interchangeable, removable deck units may be easily and quickly removed from the trailer in order to allow disabled vehicles to be carried on the trailer. One or more embodiments of the disclosure may reduce the time, equipment needed, and/or costs required to move varied types of cargo.

It should be understood, of course, that the foregoing relates to exemplary embodiments of the disclosure and that modifications may be made without departing from the spirit and scope of the disclosure as set forth in the following claims.

The invention claimed is:

1. A removable, modular, cargo deck trailer system comprising:
   a JRaD or flatbed trailer having a flat bed portion;
   first, second, and third different deck units attached to the trailer,
   wherein:
   each deck unit comprises one or more interface members for securing the deck units to the flat bed portion of the JRaD or flatbed trailer, wherein said interface members are identically located relative to the respective first, second, and third different deck units allowing the first, second, and third different deck units to be removably and interchangeably attached to an identical location of the JRaD or flatbed trailer,
   each of the first, second, and third deck units comprise at least one retractable and extendable stop member for retaining cargo;
   the flat bed portion of the JRaD or flatbed trailer comprises members configured for attachment to said interface members to secure the deck units to the JRaD or flatbed trailer;
   the first deck unit comprises a first moving apparatus comprising rollers aligned perpendicular to the lengthwise direction relative to the deck units for moving cargo in said lengthwise direction relative to the deck units,
   the second deck unit comprises a second moving apparatus comprising a plurality of hydraulic lift bars for moving the cargo in a vertical direction relative to the deck units, and
   the third deck unit comprises a third moving apparatus comprising a turntable located between side-shift rollers oriented parallel to said lengthwise direction and between pallet-turn rollers oriented perpendicularly to said lengthwise direction for moving cargo in at least one of a widthwise direction relative to the deck units or in a rotating direction relative to the deck units.

2. The cargo deck trailer system of claim 1 wherein each of the first, second, and third deck units comprise at least one forklift hole for inserting a forklift member into the at least one forklift hole.

3. The cargo deck trailer system of claim 1 wherein each of the first, second, and third deck units comprise male members oriented vertically and perpendicularly to the deck units for inserting into females holes of the cargo.

4. The cargo deck trailer system of claim 1 wherein the plurality of hydraulic lift bars are each configured to extend from positions substantially flush to or within a surface of the second deck unit to positions distances away from the surface of the second deck unit.

5. The cargo deck trailer system of claim 4 wherein the second deck unit further comprises two rows of rollers, wherein the plurality of hydraulic lift bars extend between and beyond both rows of rollers.

6. The cargo deck trailer system of claim 1 wherein the third moving apparatus is for moving the cargo in the widthwise direction and for moving the cargo in the rotating direction.

7. The cargo trailer deck system of claim 1 wherein each of the hydraulic lift bars, the turntable, the side-shift rollers, and the pallet-turn rollers are retractable and extendable relative to the deck units.

8. The cargo trailer deck system of claim 1 wherein the interface members comprise female holes, and the JRaD or flatbed trailer comprises male members extending through the female holes of the first, second, and third deck units.

9. The cargo trailer deck system of claim 8 wherein each of the first, second, and third deck units have male members oriented vertically and perpendicularly to the deck units extending through females holes of cargo attached to each of the first, second, and third deck units.

10. The cargo deck trailer system of claim 1 wherein the trailer is a JRaD trailer.

11. The cargo deck trailer system of claim 1 wherein the trailer is a flatbed trailer.

12. The cargo deck trailer system of claim 1, wherein the interface members are further configured for securing the deck units to one another.

* * * * *